United States Patent
Honda et al.

(10) Patent No.: US 11,108,092 B2
(45) Date of Patent: Aug. 31, 2021

(54) STORAGE BATTERY MANAGEMENT SYSTEM, MOVING BODY, STORAGE BATTERY, AND STORAGE BATTERY MANAGEMENT METHOD

(71) Applicant: HONDA MOTOR CO., LTD., Tokyo (JP)

(72) Inventors: Satoshi Honda, Wako (JP); Hiroki Ichikawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 148 days.

(21) Appl. No.: 16/479,278

(22) PCT Filed: Jan. 19, 2018

(86) PCT No.: PCT/JP2018/001573
§ 371 (c)(1),
(2) Date: Jul. 19, 2019

(87) PCT Pub. No.: WO2018/147046
PCT Pub. Date: Aug. 16, 2018

(65) Prior Publication Data
US 2019/0386496 A1 Dec. 19, 2019

(30) Foreign Application Priority Data
Feb. 10, 2017 (JP) .............................. JP2017-023375

(51) Int. Cl.
*H02J 7/00* (2006.01)
*B60L 58/12* (2019.01)
(Continued)

(52) U.S. Cl.
CPC ........... *H01M 10/425* (2013.01); *B60L 50/60* (2019.02); *B60L 58/18* (2019.02); *H01M 10/441* (2013.01);
(Continued)

(58) Field of Classification Search
CPC ........ H02J 7/0013; B60L 58/12; B60L 58/18; B60L 2200/12; H01M 10/441;
(Continued)

(56) References Cited

U.S. PATENT DOCUMENTS 9,296,348 B2 * 3/2016 Yano ...................... B60L 53/63
2010/0055543 A1 3/2010 Tae et al.
(Continued)

FOREIGN PATENT DOCUMENTS

DE 112014006504 12/2016
EP 2629391 8/2013
(Continued)

OTHER PUBLICATIONS

International Search Report and Written Opinion for International Application No. PCT/JP2018/001573 dated Feb. 20, 2018, 9 pgs.
(Continued)

*Primary Examiner* — Sun J Lin
(74) *Attorney, Agent, or Firm* — Amin, Turocy & Watson, LLP

(57) ABSTRACT

A storage battery management system manages a state of a storage battery that is detachably mounted. The storage battery management system includes an activation signal generation unit configured to generate an activation signal for setting a mounted storage battery to an available state, a management unit configured to manage the mounted storage battery that has received the activation signal and identification information of the mounted storage battery in association with each other, an activation signal transmission line configured to electrically connect a storage battery management unit of the mounted storage battery and the activation signal generation unit with each other, and a (Continued)

signal transmission line configured to electrically connect the storage battery management unit and the management unit to each other.

7 Claims, 8 Drawing Sheets

(51) Int. Cl.
  *B60L 58/18* (2019.01)
  *H01M 10/44* (2006.01)
  *H01M 10/42* (2006.01)
  *B60L 50/60* (2019.01)
(52) U.S. Cl.
  CPC ......... *H02J 7/0013* (2013.01); *B60L 2200/12* (2013.01); *B60Y 2200/12* (2013.01); *B60Y 2200/126* (2013.01); *H01M 2010/4271* (2013.01)
(58) Field of Classification Search
  CPC ........ H01M 2010/4271; H01M 10/425; B60Y 2200/12; B60Y 2200/126
  USPC ......................................................... 320/128
  See application file for complete search history.

(56) References Cited

U.S. PATENT DOCUMENTS

| | | |
|---|---|---|
| 2011/0175574 A1 | 7/2011 | Sim et al. |
| 2013/0181513 A1 | 7/2013 | Yano |
| 2014/0239912 A1* | 8/2014 | Hanada ................. H02J 7/0091 320/134 |
| 2017/0108555 A1 | 4/2017 | Hase et al. |

FOREIGN PATENT DOCUMENTS

| | | |
|---|---|---|
| JP | 2006-320069 | 11/2006 |
| JP | 2011-034964 | 2/2011 |
| JP | 2013-077520 | 4/2013 |
| JP | 2013-541314 | 11/2013 |
| WO | 2012/043592 | 4/2012 |

OTHER PUBLICATIONS

Extended European Search Report for European Patent Application No. 18751778.4 dated Nov. 4, 2019.

* cited by examiner

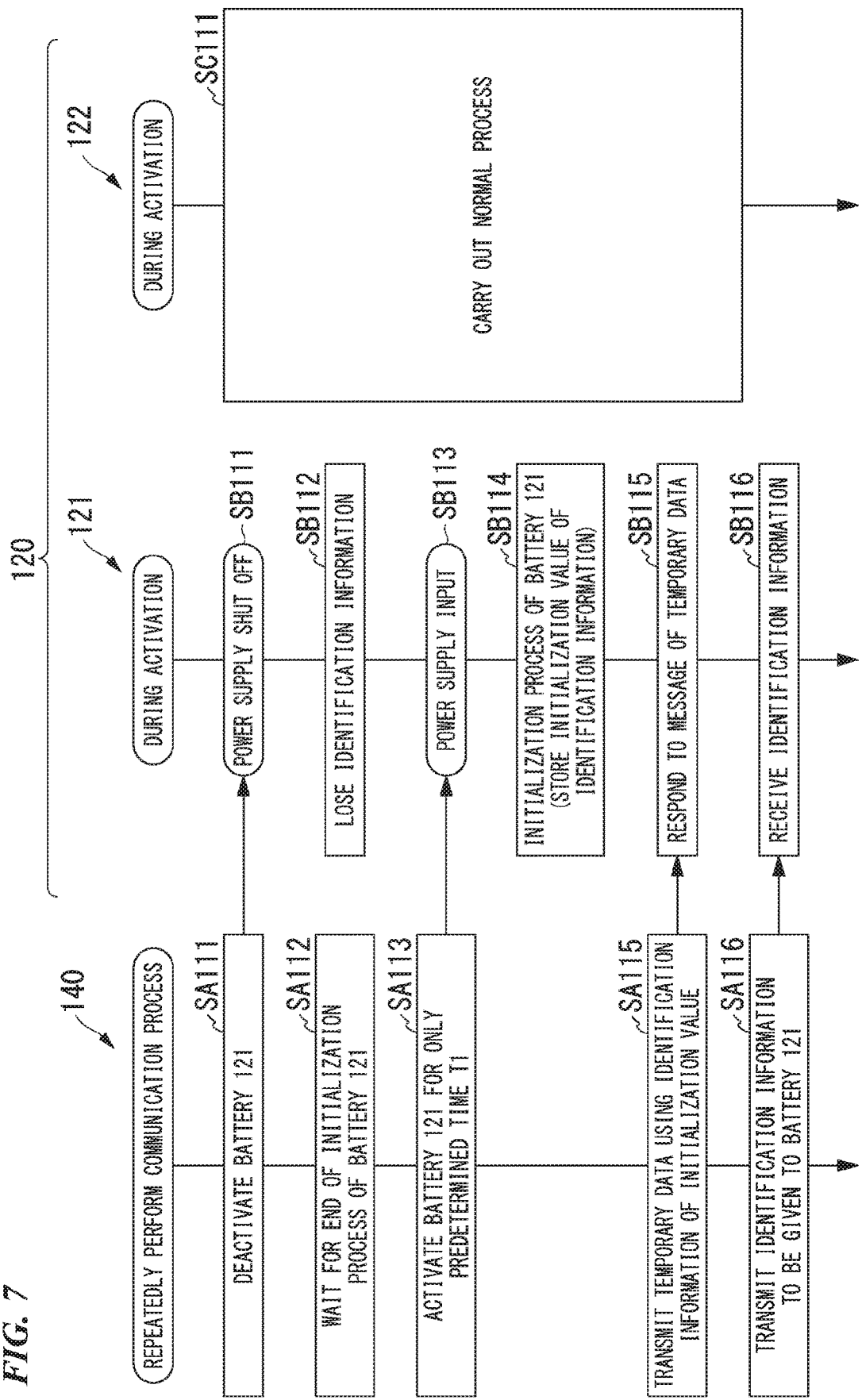

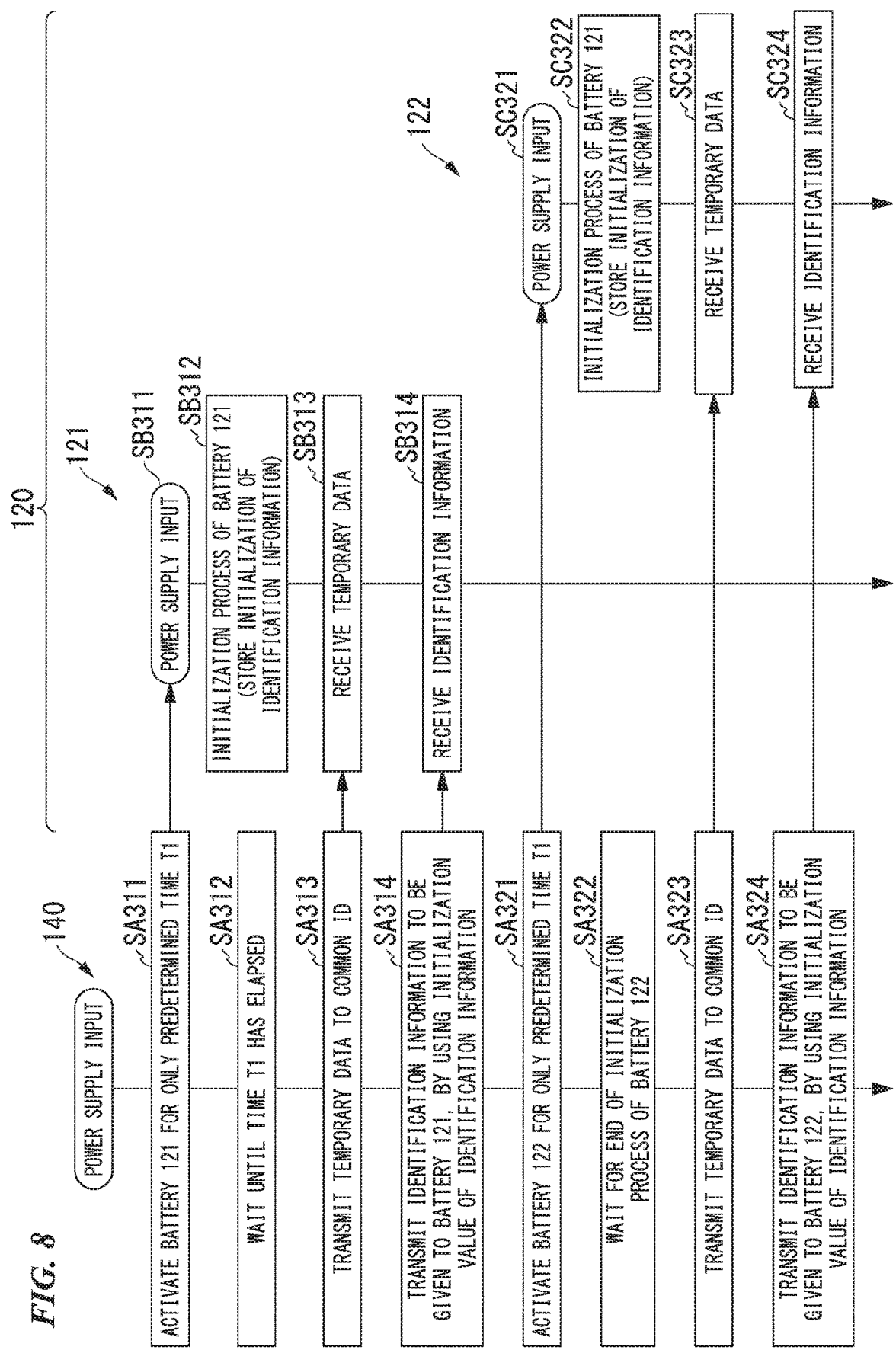

STORAGE BATTERY MANAGEMENT SYSTEM, MOVING BODY, STORAGE BATTERY, AND STORAGE BATTERY MANAGEMENT METHOD

TECHNICAL FIELD

The present invention relates to a storage battery management system, a moving body, a storage battery, and a storage battery management method.

Priority is claimed on Japanese Patent Application No. 2017-023375, filed on Feb. 10, 2017, the contents of which are incorporated herein by reference.

BACKGROUND

In recent years, storage batteries have been used as energy sources for devices such as moving bodies such as electric vehicles and portable terminals. The capacity of the storage batteries is required to be commensurate with an electric power amount required for a device. In addition, the electric power amount of the device is able to be secured by replacing a mounted storage battery in a planned manner, at the time of an emergency, or the like.

A battery pack in which a plurality of battery modules (storage batteries) are combined is known. Such a battery pack may internally include a management unit (battery management unit (BMU)) that manages a charge state or the like of the battery module. When a plurality of battery modules are combined and used, a method in which a control unit of an upper rank identifies individual management units and manages a state of a battery module corresponding to the management unit is known (for example, Patent Document 1). In a case in which the control unit of the upper rank individually manages a plurality of battery modules as described in Patent Document 1, it is necessary for the control unit to identify individual management units corresponding to the battery modules.

Implementing electrical control of a vehicle in accordance with the CAN communication standard is known. According to the CAN communication standard, the devices are electrically connected by a CAN-BUS (communication line), and the same signal is propagated to all devices (CAN reception units) that are able to receive a signal.

RELATED ART DOCUMENTS

Patent Documents

[Patent Document 1]
Published Japanese Translation No. 2013-541314 of the PCT International Publication

SUMMARY OF INVENTION

Problems to be Solved by the Invention

However, according to the CAN communication standard, in a case in which the same identification information is given, and the plurality of devices that are able to receive the signal from the CAN-BUS are present on the same CAN-BUS, a result of a process of each device may not be correctly identified, and thus confusion may occur.

In addition, according to Patent Document 1, a physical position at which the battery module is mounted is specified, and the management unit (BMS) of each battery module sequentially transmits information for giving an identification number for specifying the battery module. In this case, when a specific management unit is not able to perform the above-described transmission, it is not possible to obtain information from a management unit subsequent to the management unit. In addition, as the number of management units increases, the time taken to give the identification information increases, and the time until the device becomes available may be delayed, which may reduce the convenience of the device.

An object of an aspect of the present invention is to provide a storage battery management system, a moving body, a storage battery, and a storage battery management method capable of further increasing the convenience of a device on which a storage battery is detachably mounted.

Means for Solving the Problem

A storage battery management system according to an aspect of the present invention manages a state of a storage battery that is detachably mounted. The storage battery management system includes an activation signal generation unit configured to generate an activation signal for setting a mounted storage battery to an available state, a management unit configured to manage the storage battery that has received the activation signal and identification information of the storage battery in association with each other, an activation signal transmission line configured to electrically connect a storage battery management unit of the storage battery and the activation signal processing unit with each other, and a signal transmission line configured to electrically connect the storage battery management unit and the management unit to each other.

In the storage battery management system described above, the management unit may transmit the identification information of the storage battery to the storage battery through a communication IF unit activated by the activation signal.

In the storage battery management system described above, the activation signal generation unit may generate the activation signal for controlling an activation state of the storage battery for each storage battery.

In the storage battery management system described above, the activation signal generation unit may generate a first activation signal as the activation signal for a first storage battery, give first identification information corresponding to the first activation signal to the first storage battery, and then generate a second activation signal as the activation signal for a second storage battery.

In the storage battery management system described above, the activation signal generation unit may recover the activation signal until the storage battery management unit of the storage battery loses a control state after transmitting the activation signal to be given to the storage battery of a target to be activated.

In the storage battery management system described above, the activation signal generation unit may generate an initialization request signal that continues for a predetermined time set in advance and the activation signal that is delayed from the initialization request signal and is transmitted so as not to overlap a transmission period of the initialization request signal.

In the storage battery management system described above, the management unit may give the identification information of the storage battery to the storage battery management unit of the storage battery that has received the activation signal to associate the storage battery management unit and the identification information of the storage battery with each other, during a period in which the initialization request signal and the activation signal are not transmitted from the activation signal generation unit.

A moving body according to another aspect of the present invention manages a state of a storage battery that is detachably mounted. The moving body includes an activation signal generation unit configured to generate an activation signal for setting the storage battery to an available state with respect to a mounted storage battery, a management unit configured to associate identification information of the storage battery with a storage battery management unit of the storage battery that has received the activation signal, an activation signal transmission line configured to electrically connect a storage battery management unit of the storage battery and the activation signal processing unit with each other, a signal transmission line configured to electrically connect the storage battery management unit and the management unit with each other, and a drive unit configured to be driven by electric power from the storage battery.

A storage battery according to yet another aspect of the present invention is detachably mounted on a device. The storage battery includes a communication IF unit configured to receive an activation signal from the device and to be activated by the activation signal, and a battery management unit configured to acquire identification information of the storage battery from the device in an activated state by the activation signal.

A storage battery management method according to yet another aspect of the present invention is for managing a state of a storage battery that is detachably mounted. The storage battery management method includes generating an activation signal for setting the storage battery to an available state with respect to a mounted storage battery, and associating identification information of the storage battery with a storage battery management unit of the storage battery that has received the activation signal.

The storage battery management method described above may include sequentially activating the plurality of storage batteries mounted on a moving body in accordance with a predetermined order, and giving the identification information to the storage battery.

Advantage of the Invention

According to the configuration described above, the storage battery management system that manages a state of a storage battery that is detachably mounted includes an activation signal generation unit configured to generate an activation signal for setting the mounted storage battery to an available state, a management unit configured to manage the storage battery that has received the activation signal and identification information of the storage battery in association with each other, an activation signal transmission line configured to electrically connect a storage battery management unit of the storage battery and the activation signal processing unit with each other, and a signal transmission line configured to electrically connect the storage battery management unit and the management unit to each other. Thereby, it is possible to further increase the convenience of a device on which a plurality of storage batteries are mounted.

BRIEF DESCRIPTION OF THE DRAWINGS

FIG. 7 is a diagram for describing a process for resetting the identification number in the battery of the embodiment.

FIG. 8 is a diagram for describing a process for activating the battery of a second embodiment.

DESCRIPTION OF THE EMBODIMENTS

First Embodiment

Figure 1:
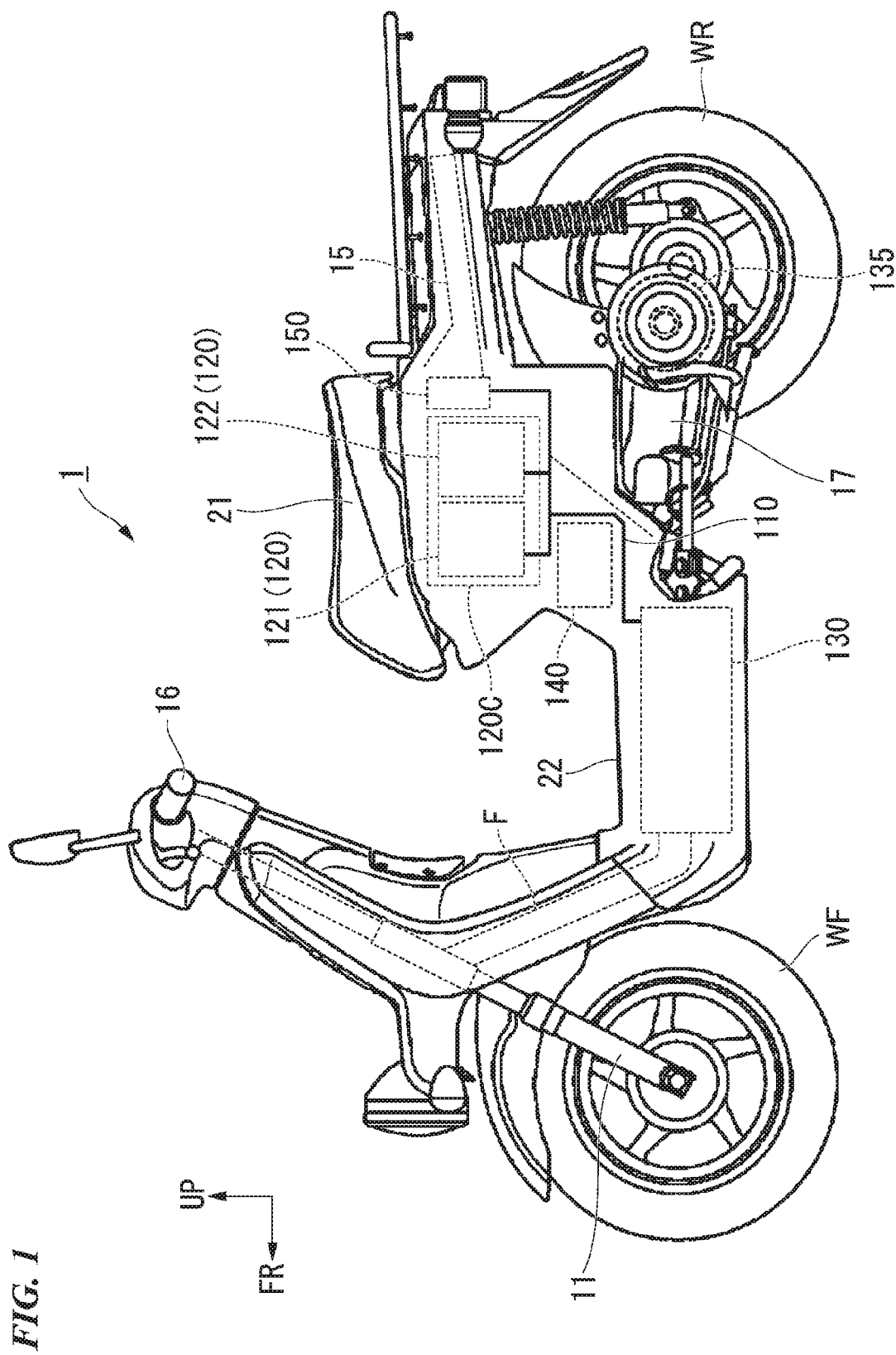
FIG. 1 is a diagram showing an example of a saddle-ride type electric vehicle of a first embodiment.

Hereinafter, embodiments of the present invention will be described with reference to the drawings. Note that the drawings are viewed in directions of reference numerals, and the left, right, front, and back directions are directions seen by a driver.

FIG. 1 is a diagram showing an example of a saddle-ride type electric vehicle to which an electric circuit of the embodiment is applied. FIG. 1 shows an example of a scooter-type saddle-ride type electric vehicle (hereinafter referred to as an "electric motorcycle") having a low floor. The electric motorcycle 1 shown in FIG. 1 is an example of a moving body and a device. A body frame F of the electric motorcycle 1 steerably supports a front fork 11. A front wheel WF is pivotally supported at a lower end of the front fork 11. A steering handle 16 is connected to an upper portion of the front fork 11.

A front end portion of a swing arm 17 is supported to be oscillated at a rear portion of the vehicle body frame F.

An electric motor 135 is provided at a rear end portion of the swing arm 17. A rear wheel WR is rotationally driven by power output from the electric motor 135.

A pair of left and right seat frames 15 are provided to be connected to the rear portion of the vehicle body frame F. A passenger seat 21 is supported by the seat frame 15. In addition, a vehicle body cover 22 of a synthetic resin, which covers the vehicle body frame F, is attached to the vehicle body frame F.

FIG. 1 shows a disposition example of some electrical components. For example, a battery storage portion 120C of a synthetic resin is provided between the pair of left and right seat frames 15 at a lower portion of the passenger seat 21. A battery 120 (storage battery) is detachably stored in the battery storage portion 120C.

The electric motor 135 provided on the swing arm 17 is driven by a power device unit (PDU) 130 by electric power supplied from the battery 120 through an electric circuit 110, and rotational power of a time when the electric motor 135 is driven is transmitted to the rear wheel WR. Therefore, the electric motorcycle 1 travels. For example, the battery 120 of the embodiment is divided into a plurality of battery units such as batteries 121 and 122. The traveling of the electric motorcycle 1 is controlled by, for example, an electric control unit (ECU) 140 or the like disposed at an appropriate position such as an inside of the vehicle body cover 22. A charger 150 converts electric power supplied from the outside, and charges the battery 120 through the electric circuit 110. The charger 150 may be detachable from electric motorcycle 1.

Figure 2:
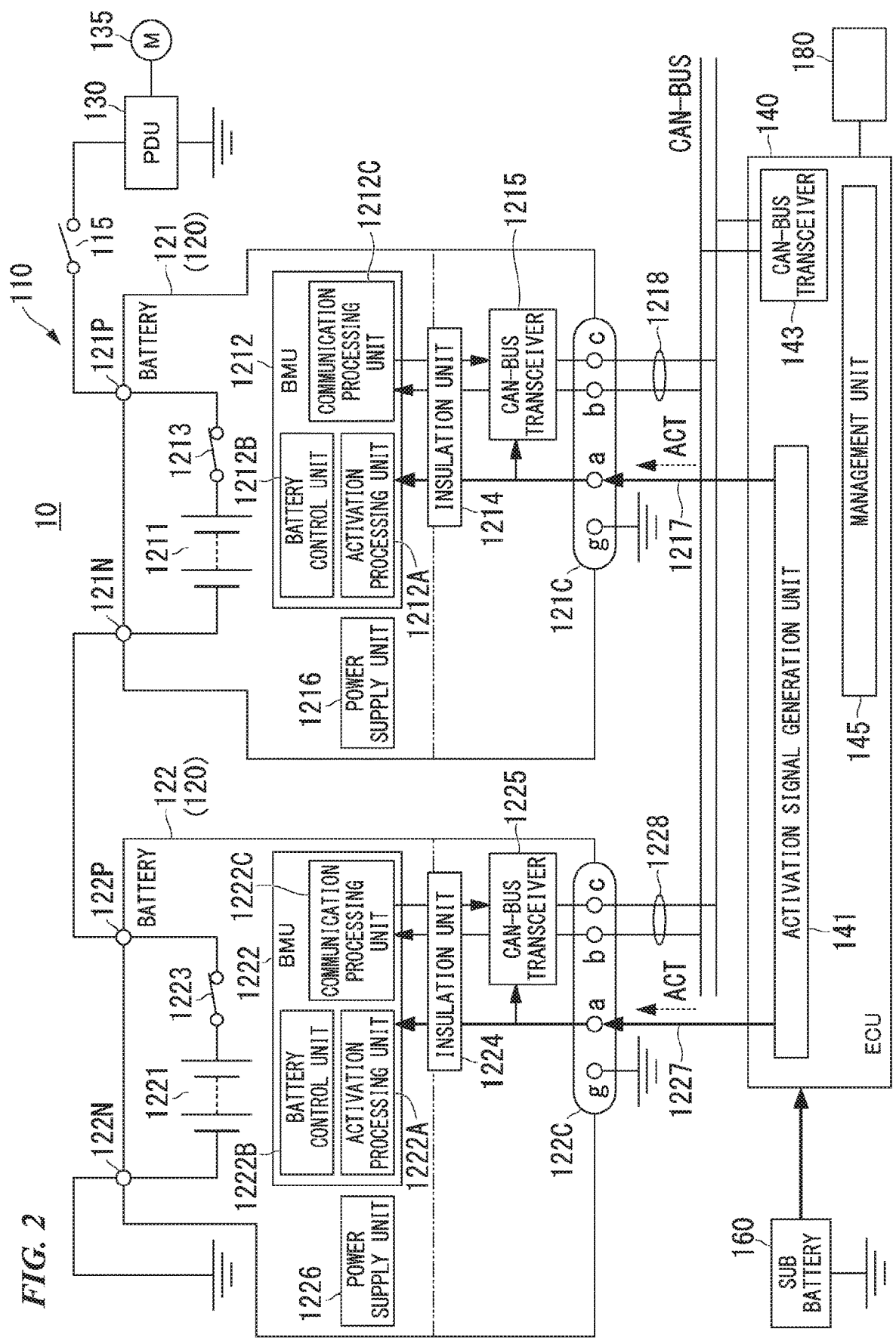
FIG. 2 is a block diagram showing a schematic constitution of a storage battery that stores electric power for driving an electric motorcycle and a control system of the storage battery of the present embodiment.

A state of the mounted battery 120 is managed by a control system 10 (FIG. 2).

FIG. 2 is a block diagram showing a schematic constitution of a storage battery that stores electric power for driving the electric motorcycle 1 and a control system of the storage battery of the present embodiment.

The control system 10 (storage battery management system) includes the electric circuit 110, the battery 120, the PDU 130 (load), the ECU 140, and a sub battery 160.

The electrical circuit 110 electrically connects the battery 120 (power supply and first switch), a contactor 115 (first contactor), and the PDU 130 (load) with one another. The connection shown in FIG. 2 shows an example in which the battery 120 (power supply and first switch), the contactor 115 (first contactor), and the PDU 130 (load) are connected with one another in series.

For example, the electric circuit 110 includes a CAN-BUS (communication line) conforming to a CAN communication standard used for propagation of a control signal and the like. At least the battery 120 and the ECU 140 are connected to the CAN-BUS and communicate through the CAN-BUS. For example, a signal transmitted from the ECU 140 is propagated by the CAN-BUS to each device such as the battery 120 and the PDU 130 capable of receiving the signal. Therefore, in a case in which a plurality of devices capable of receiving the signal from CAN-BUS are present on the same CAN-BUS, it is necessary to correctly identify a result of a process of each of the devices. The control system 10 of the present embodiment realizes this request with the following constitution. Note that the connection of the electric circuit 110 is not limited to the above-described constitution and may be another connection form.

The battery 120 includes, for example, the batteries 121 and 122. The batteries 121 and 122 are an example of a plurality of power storage units. The battery 120 generates a predetermined voltage (for example, a nominal voltage of 48 V) by connecting a plurality of single batteries such as a lithium ion battery, a nickel hydrogen battery, and a lead battery in series. The electric power from the batteries 121 and 122 is supplied to the PDU 130 that controls an output of the electric motor 135 through the electric circuit 110. For example, the electric power from the batteries 121 and 122 is supplied to the electric motor 135 that is a three phase alternating current motor after being converted from a direct current to a three phase alternating current by the PDU 130. The PDU 130 is a so-called inverter.

For example, an output voltage of the batteries 121 and 122 is stepped down to a low voltage (for example, 12 V) by a DC-DC converter (not shown) and supplied to control system components such as the ECU 140 and the sub battery 160.

In addition, some of the electric power of the low voltage that is stepped down by the DC-DC converter is supplied to a control battery 125 (not shown) or a general electric component such as a lamp (not shown).

The batteries 121 and 122 are able to be charged by, for example, the charger 150 or the like connected to a power supply of AC 100 V.

The battery 121 (first storage battery) of the embodiment includes a battery main body 1211, a battery managing unit (BMU) 1212 (storage battery management unit), a bidirectional switch 1213, an insulation unit 1214, a CAN-BUS transceiver (communication IF unit) 1215 (hereinafter referred to as transceiver 1215), a power supply unit 1216, a high potential side terminal 121P, a low potential side terminal 121N, and a connector 121C. Similarly, the battery 122 (second storage battery) includes a battery main body 1221, a BMU 1222 (storage battery management unit), a bidirectional switch 1223, an insulation unit 1224, a CAN-BUS transceiver (communication IF unit) 1225 (hereinafter referred to as a transceiver 1225), a power supply unit 1226, a high potential side terminal 122P, a low potential side terminal 122N, and a connector 122C.

Hereinafter, the details will be described by taking the battery 121 as an example.

The battery main body 1211 forms a secondary battery by a plurality of cells connected with each other in series.

The bidirectional switch 1213 is provided in series with the battery body 1211, and a conduction state is determined by control of the BMU 1212.

The BMU 1212 detects a state of the battery body 1211 and notifies the ECU 140 or the like of the detected state. An operation state of the BMU 1212 is determined by control from the ECU 140 or the like, and the BMU 1212 controls the conduction state of the bidirectional switch 1213 in accordance with the determined operation state.

The insulation unit 1214 is configured by an optical coupler or the like. The insulation unit 1214 electrically insulates a side of the BMU 1212 from a side of the connector 121C with respect to a signal between the BMU 1212 and the connector 121C. For example, the insulation unit 1214 electrically insulates and converts an activation signal ACT supplied from the terminal a of the connector 121C to the BMU 1212 and supplies the converted signal to the BMU 1212. Note that the terminal a of the connector 121C connected to the insulation unit 1214 is connected to the ECU 140 through an activate line 1217 (activation signal transmission line). In addition, the insulation unit 1214 is provided between the BMU 1212 and the transceiver 1215. The insulation unit 1214 electrically insulates and converts a signal between the BMU 1212 and the transceiver 1215.

The transceiver 1215 converts a signal used for communication between the BMU 1212 and the ECU 140 and relays the signal in both directions. For example, the ECU 140 and the battery 120 communicate through the CAN-BUS in accordance with the CAN standard. The transceiver 1215 in this case is provided on a side of the connector 121C with respect to the insulation unit 1214. A terminal b and a terminal c of the connector 121C connected to the transceiver 1215 are connected to the CAN-BUS through a CAN communication line 1218 (signal transmission line). The transceiver 1215 satisfies an electrical connection condition (a physical condition of the CAN standard) with the CAN-BUS.

The power supply unit 1216 receives the supply of the electric power from the battery main body 1211 and supplies some of the electric power to the BMU 1212, the insulation unit 1214, and the like. That is, the power supply unit 1216 is provided on a side of the battery main body 1211 with respect to the insulation unit 1214 and is electrically insulated from a side of the connector 121C.

As described above, the storage battery management unit (BMU 1212) that functions by the electric power of the battery 121 and the transceiver 1215 are electrically insulated from each other by the insulation unit 1214.

The high potential side terminal 121P is a positive electrode of the battery 121. The low potential side terminal 121N is a negative electrode of the battery 121. In a case in which the bidirectional switch 1213 is in the conduction state, a desired voltage is generated between the high potential side terminal 121P and the low potential side terminal 121N.

The connector 121C includes a plurality of signal terminals for transmitting and receiving signals for controlling the battery 121. For example, the signals transmitted and received through the connector 121C include the activation signal ACT for activating the battery 121 and a signal for the BMU 1212 to communicate with the ECU 140. The connector 121C includes a ground terminal and the like in addition to the terminals for the signals. The connector 121C described above is an example of a case in which an electrical signal is transmitted and received, is not limited to thereto, and may optically transmit and receive a signal.

Note that the battery 122 is also similar to the battery 121. In the following description, the BMU 1212 and BMU 1222 may be collectively referred to simply as a BMU. Situations of charge and discharge of the battery, a storage amount of the battery main body, a temperature, and the like are monitored by the BMU of each battery. A result of the monitoring is shared with the ECU 140. The BMU restricts the charge and the discharge of the battery main body 1211 and the like by controlling the bidirectional switch 1213 and the like by a control instruction from the ECU 140 described later or the monitoring result described above. Details related to the communication between the BMU and the ECU 140 will be described later.

The contactor 115 is provided between the high potential side terminal 122P of the battery 121 and the PDU 130. The contactor 115 electrically connects between the high potential side terminal 122P of the battery 121 and the PDU 130 and disconnects the electrical connection. The contactor 115 connects the battery 120 to the PDU 130 in a conduction state. The contactor 115 disconnects the battery 120 from the PDU 130 in a disconnection state.

The ECU 140 includes an activation signal generation unit 141, a CAN-BUS transceiver 143 (hereinafter referred to as a transceiver 143), and a management unit 145.

The activation signal generation unit 141 generates the activation signal ACT for setting the battery 120 to be an available state. The activation signal generation unit 141 supplies the generated activation signal ACT to the battery 121 through the Activate line 1217. The activation signal generation unit 141 supplies the generated activation signal ACT to the battery 122 through the Activate line 1227 (activation signal transmission line). As described above, the ACTIVATE line for supplying the activation signal ACT is formed as individually different wires with respect to the individual batteries 120. Therefore, the activation signal generation unit 141 is able to individually activate (start) the battery 120.

The activation signal generation unit 141 assumes that a voltage the same as the voltage supplied from sub battery 160 to ECU 140 indicates a state in which the activation signal ACT is significant. That is, activation signal generation unit 141 outputs the voltage the same as the voltage supplied from sub battery 160 to ECU 140 in a case in which the activation signal ACT indicates a significant state. For example, the activation signal generation unit 141 may include a switch (not shown) and generate the activation signal ACT by controlling the conduction state of the switch. The activation signal generation unit 141 generates the activation signal ACT for each battery 120. Therefore, it is possible to individually control an activation state of the battery 120.

The transceiver 143 converts the signal used for the communication between the BMU 1212 and the ECU 140 and relays the signal in both directions. For example, the ECU 140 and the battery 120 communicate through the CAN-BUS in accordance with the CAN standard. The transceiver 143 in this case satisfies the electrical connection condition with the CAN-BUS (the physical condition of the CAN standard).

The management unit 145 associates the battery 120 that has received the activation signal ACT with the identification information of the battery 120, and gives the identification information to each of the batteries 120. The management unit 145 transmits the identification information of the battery 120 to the storage battery management unit (BMU 1212) through the transceiver 1215 activated by the activation signal ACT.

Furthermore, information on an output request from a throttle (accelerator) sensor 180 is input to the ECU 140. After ending an initialization process of the battery 120, the management unit 145 controls the contactor 115, the battery 120, the PDU 130, and the like on the basis of the information on the output request input to the ECU 140.

The ECU 140 is able to regulate the charge and the discharge of the battery 120 by controlling the battery 120.

The ECU 140 controls the contactor 115 to limit the supply of power to the battery 120. The ECU 140 controls the driving of the electric motor 135 by controlling the electric power supplied to the electric motor 135 by the PDU 130.

[Regarding BMU]

An example of the BMU will be described. The BMU 1212 shown in FIG. 2 includes an activation control unit 1212A, a battery control unit 1212B, and a communication control unit 1212C.

The activation control unit 1212A sets the state of battery 121 to an activation state in which an output of the electric power is possible, on the basis of the activation signal ACT supplied from ECU 140. For example, the activation control unit 1212A detects that the activation signal ACT is in a significant state to set the state of the battery 121 to the activation state in which the output of the electric power is possible. The activation control unit 1212A detects that the activation signal ACT is not a significant state to set the state of the battery 121 to a non-activation state in which electric power is not output.

For example, the battery control unit 1212B detects a change of a state (voltage, SoC, or the like) of each cell of the battery main body 1211, and adjusts the state of charge of each cell to be uniform. In addition, the battery control unit 1212B controls the bidirectional switch 1213 by the control or the like of the ECU 140 to set the battery 121 to be available.

The communication control unit 1212C communicates with the ECU 140 in accordance with a predetermined protocol. For example, the communication control unit 1212C communicates information for controlling the charge and the discharge of the battery 121 with the ECU 140. The communication control unit 1212C and the ECU 140 communicate by including the identification information for the ECU 140 to identify the battery 121 in the above-described information. The communication control unit 1212C stores the identification information notified from ECU 140 in a storage area (not shown) in the BMU.

The battery 120 is mounted on the electric motorcycle 1 and operates in accordance with the control signal from the ECU 140 or the like.

Incidentally, in the control system 10 which permits the attachment and detachment of the battery 120, the following usage form is possible, and thus the correspondence with the following event is necessary.

[Example of Usage Form for Replacing Battery 120]

A battery station that always has a plurality of charged batteries as a replacement battery is known. Battery unique identification information (ID) may not be given to the battery stored in the battery station.

A plurality of batteries 120 of the same type are mounted on the electric motorcycle 1 of the embodiment. The identification information for identifying an individual, which allows the electric motorcycle 1 to identify the individual may not be given to the battery 120 at a stage before being mounted on the electric motorcycle 1. Note that although the battery 120 has the unique identification information for identifying the type, in a case in which the plurality of batteries 120 of the same type are mounted, it is not possible to identify the individual battery 120 by only the identification information for identifying the type.

Therefore, the ECU 140 of the present embodiment carries out a process for setting the battery to a distinguishable state by giving the identification information to individual battery. Note that, in a case in which a plurality of batteries are mounted, the ECU 140 makes it possible to identify an individual by giving different pieces of identification information to each of batteries.

In addition, in general, the battery is replaced while the electric motorcycle 1 is stopped. That is, in a stage in which the electric motorcycle 1 is activated, it is not possible to determine whether the same battery as that before the stop is mounted or whether the replaced battery is mounted.

Next, an example in which the identification information is given to each battery to make each battery distinguishable will be described.

Figure 3:
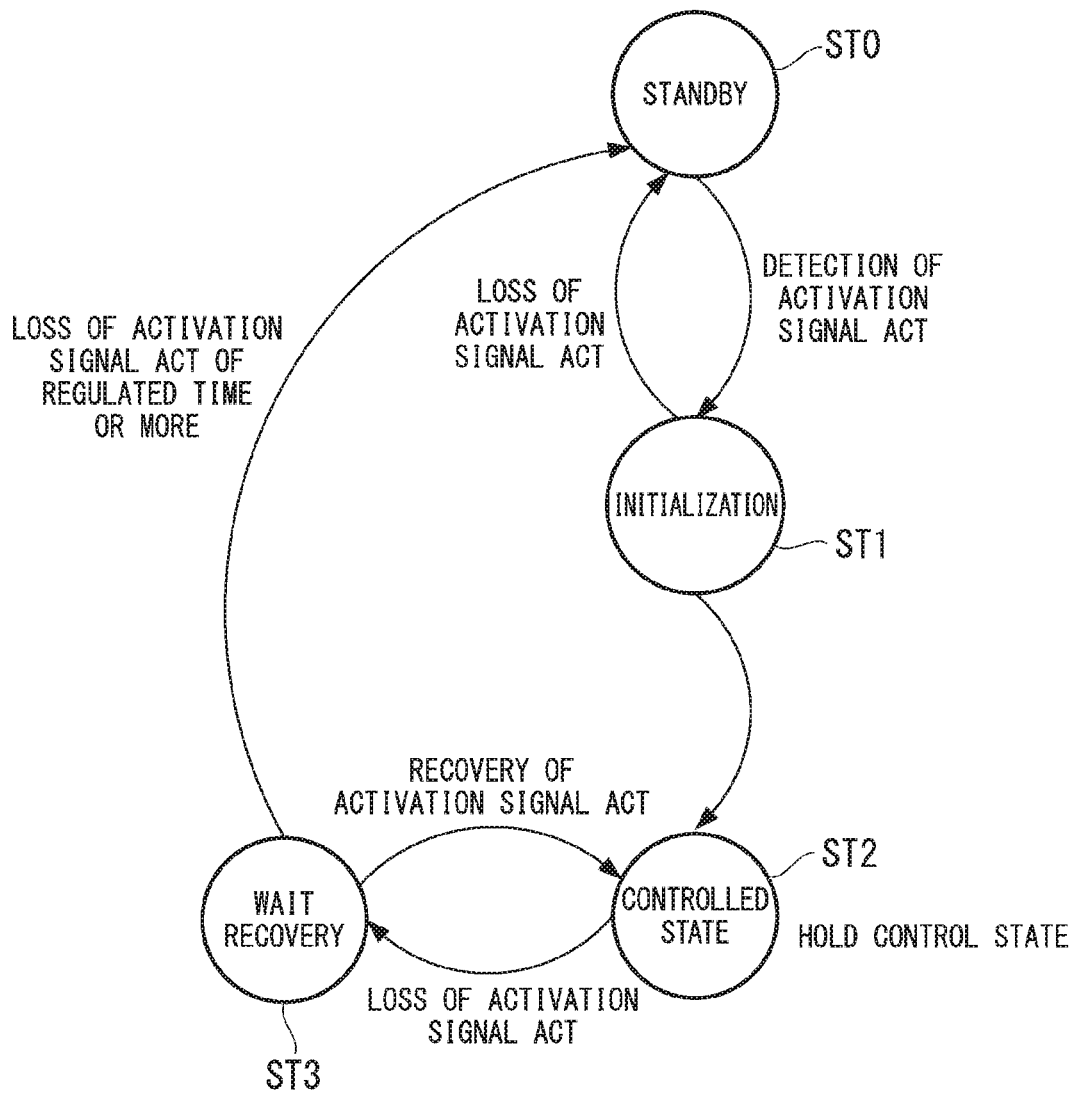
FIG. 3 is a diagram for describing an activation process of a battery of the embodiment.

FIG. 3 is a diagram for describing an activation process of the battery of the embodiment. A state transition of the battery 120 is shown in FIG. 3. Hereinafter, each state will be described in order.

State ST0: Standby State

First, the battery 120 is in an initial state that is a standby state in which neither the charge nor the discharge is performed. In a case in which the BMU detects the activation signal ACT, the BMU shifts a control state thereof to a state ST1 for executing an initialization process.

State ST1: Initialization State

In this initialization state, the BMU performs an initialization process that is set in advance. The BMU shifts the control state thereof to a controlled state (state ST2) by an end of the initialization process.

Note that a time required for the initialization process is able to be estimated in advance, and for example, is assumed to be sufficiently shorter than a time T1.

However, in a case in which the activation signal ACT ceases, the BMU shifts the control state thereof to the standby state (state ST0) waiting for the activation signal ACT.

State ST2: Controlled State

The controlled state is a state in which it is possible to switch between a state in which the electric power is supplied and a state in which the supply of the electric power is restricted in accordance with the control from the ECU 140. For example, in the controlled state, the electric motorcycle 1 is able to travel using the electric power of the battery 120. In the controlled state, the activation signal ACT is maintained in the significant state.

However, in a case in which the activation signal ACT ceases, the BMU shifts the control state thereof to a recovery standby state (state ST3) waiting for recovery of the activation signal ACT.

State ST3: Recovery Standby State

The recovery standby state includes a state in which it is determined that the activation signal ACT is not significant due to an influence of noise or vibration. In a case in which the activation signal ACT recovers to a significant state before a predetermined time has elapsed and thus a state in which the activation signal ACT is not significant continues for a predetermined time or more, the BMU shifts the control state thereof to the controlled state (state ST2).

On the other hand, in a case in which the state in which the activation signal ACT is not significant continues for the predetermined time or more, the BMU shifts the control state thereof to the standby state (state ST0).

Figure 4:
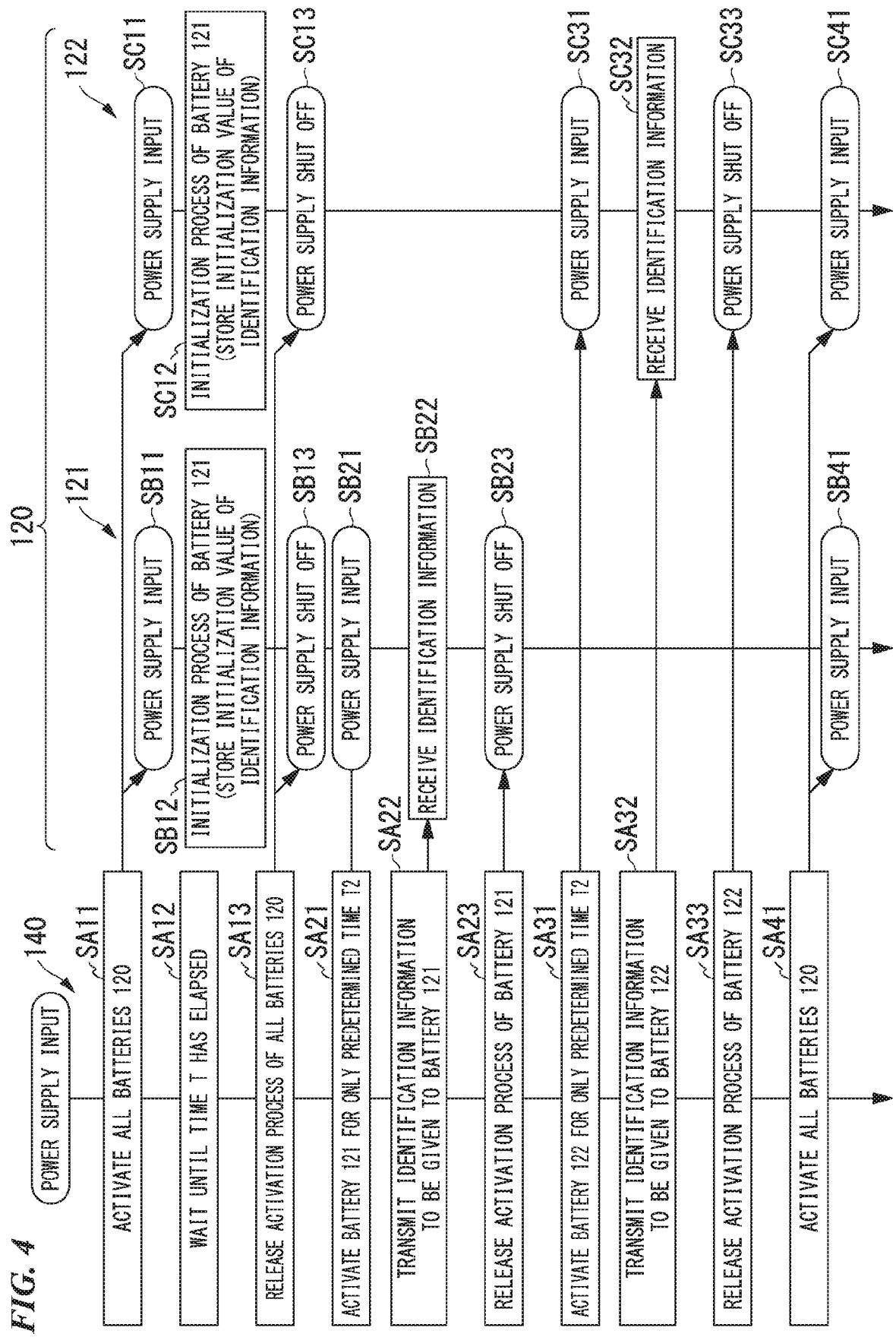
FIG. 4 is a diagram for describing a process for activating the battery of the embodiment.

FIG. 4 is a diagram for describing a process for activating the battery of the embodiment.

FIG. 4 shows transmission and reception of signals between the ECU 140, the battery 121, and the battery 122, and a process related to the transmission and reception of the signals.

First, the activation signal generation unit 141 of the ECU 140 transmits the activation signal ACT to all the batteries 120 (battery 121 and battery 122) to activate each battery 120 (SA11). The ECU 140 continues the state until the predetermined time T1 that is set in advance has elapsed (SA12). For example, the predetermined time is set to about one second.

The battery 121 that has received the activation signal ACT supplies the electric power for control to the BMU 1212 from the power supply unit 1216 to input power supply (SB11). The BMU 1212 carries out the initialization process at the time of the activation (SB12), sets an initial value "#1" that is set in advance in the identification information (ID), and stores the initial value in the storage area.

Next, the activation signal generation unit 141 of the ECU 140 transmits a signal for releasing the activation by the activation signal ACT to temporarily release the activation state of all the batteries 120 (SA13).

Therefore, since the transceiver 1215 of the battery 121 functions using the electric power of the activation signal ACT, the activation signal ACT is stopped along with the release of the activation state, and thus the electric power is shut off. Therefore, the function is stopped and communication is not able to be performed (SB13). That is, the battery 121 in which the transceiver 1215 is in the inactive state does not acquire a message flowing to the CAN-BUS. Note that, even in a case in which the activation signal ACT is stopped, the BMU 1212 of the battery 121 holds the control state thereof until a predetermined time has elapsed.

Next, the activation signal generation unit 141 of the ECU 140 transmits the activation signal ACT to the battery 121 to activate the battery 121 (SA21). Note that the transmission of the activation signal ACT to the battery 121 is continued for about a time T2. In the battery 121, the control power supply to the transceiver 1215 is input again (SB21).

Next, the management unit 145 of the ECU 140 notifies identification information "#B1" given to the battery 121 (SA22). For example, the activation signal generation unit 141 gives the individual identification information ("#B1") to the battery 121 and generates a message M1 addressed to the battery of which the identification information (ID) is "#B1", that is, the battery 121. The activation signal generation unit 141 transmits the message M1 after waiting for a predetermined time T3 that is set in advance from the transmission of the activation signal ACT to the battery 121 in the above-described SA21.

Next, the BMU 1212 of the battery 121 receives the above-described message M1, obtains the identification information "#B1", and responds to this (SB22). The BMU 1212 stores the identification information "#B1" in the storage area and responds to the message M1.

Next, the activation signal generation unit 141 of the ECU 140 transmits the signal for releasing the activation of the battery 121 and releases the activation state of the battery 121 again (SA23). The battery 121 receives this, and the power supply of the transceiver 1215 is shut off (SB23).

New identification information "#B1" is set in the battery 121 by the process up to here.

Subsequently, the ECU 140 sets new identification information "#B2" in the battery 122 by performing processes of procedures (SA31 to SA33) similar to the procedures of SA21 to SA23 described above.

The processes of SC31 to SC33 in the battery 122 are similar to the processes of SB21 to SB23 in the battery 121.

Next, the activation signal generation unit 141 of the ECU 140 resumes the transmission of the activation signal ACT to all the batteries 120 to set all the batteries 120 to the activation state (SA41). Therefore, the control power supply is input to the transceiver 1215 in the battery 121 (SB41), and the control power supply is input to the transceiver 1225 in the battery 122 (SC41).

By the process described above, the ECU 140 is able to give new identification information to the battery 121 and the battery 122 to which the identification information is not set and pieces of the identification information are able to be different from each other.

Note that, although the procedure shown in FIG. 4 shows a case in which two batteries are controlled, the number of batteries, the order of the setting, and the like are not limited thereto, and are able to be appropriately selected.

An example in which it is assumed that a specific battery loses identification information that is once set, due to some factor will be described.

Figure 5:
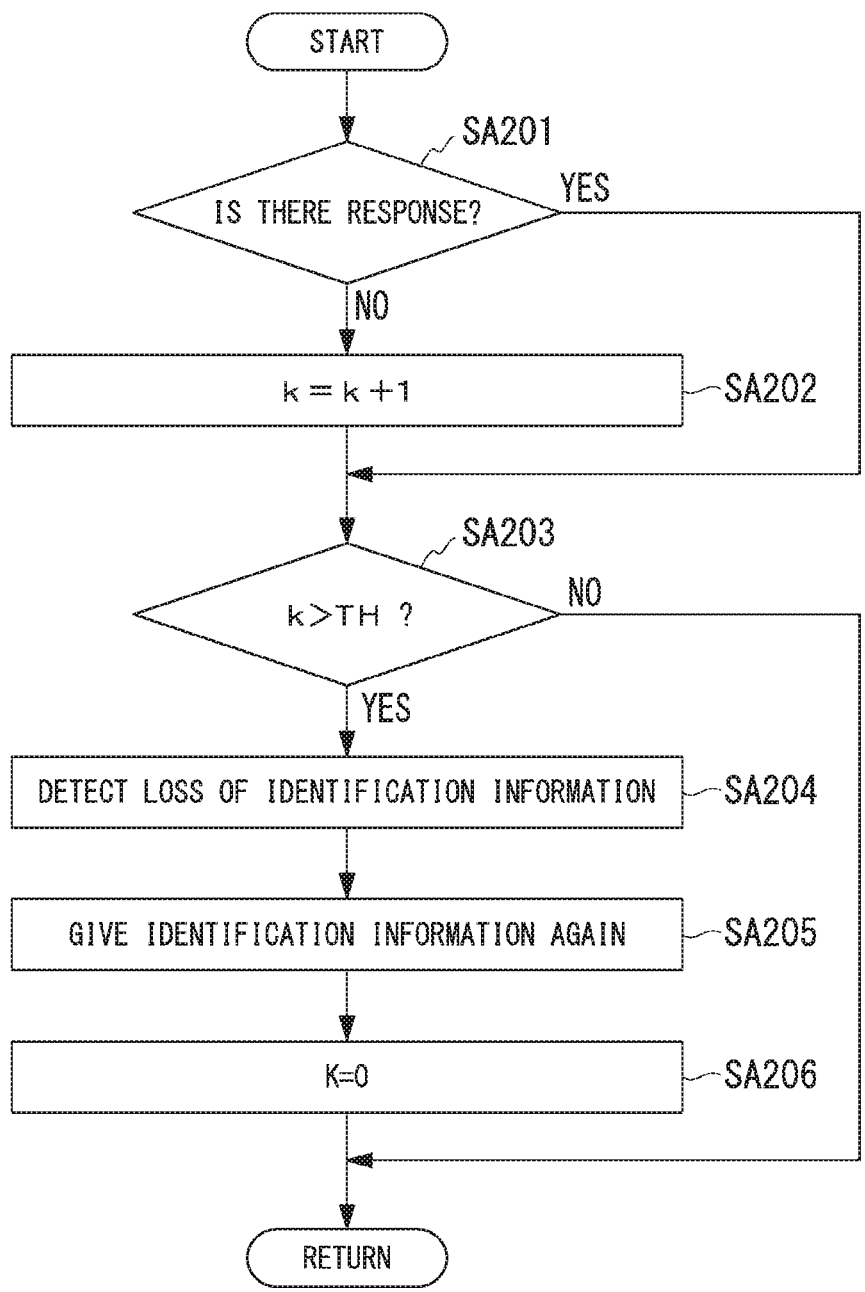
FIG. 5 is a flowchart showing a process for detecting that identification information is stored in the battery of the embodiment.

FIG. 5 is a flowchart showing a process for detecting that the identification information is stored in the battery of the embodiment. The initial state in the procedure shown in FIG. 5 is a state in which the identification information of the battery 120 is given by the procedure shown in FIG. 4.

The BMU receives and responds to the message from the ECU 140 on the basis of the set identification information. However, in a case in which the identification information is lost, at least response message is not able to be transmitted. For example, by detecting the response message, it may be estimated whether or not desired identification information is hold in the battery 120. Hereinafter, an example of the process will be described.

The following process is repeatedly performed in a period that is set in advance in the management unit 145 of the ECU 140 and is carried out for each battery. The following description exemplifies the battery 121. Note that, before starting a first process, a value of a variable k is initialized to "0".

First, the management unit 145 determines whether or not there is a response message from the battery 121 among the received messages (SA201). In a case in which there is the response message from the battery 121 (SA201: Yes), the management unit 145 advances the process to SA203.

In a case in which there is no response message from the battery 121 (SA201: No), 1 is added to the variable k for update (SA202).

In a case in which the process of SA202 is ended, or in a case in which there is the response message from the battery 121 at SA201, it is determined whether or not the value of the variable k exceeds a threshold value TH (SA203). In a case in which the value of the variable k does not exceed the threshold value TH (SA203: No), a series of processes shown in FIG. 5 is ended.

In a case in which the value of the variable k exceeds the threshold value TH (SA203: Yes), the management unit 145 detects that the battery 121 loses the identification information (SA204), and gives the identification information again (SA205). At the same time, the value of the variable k is set to "0" (SA206), and the series of processes shown in FIG. 5 is ended.

Figure 6:
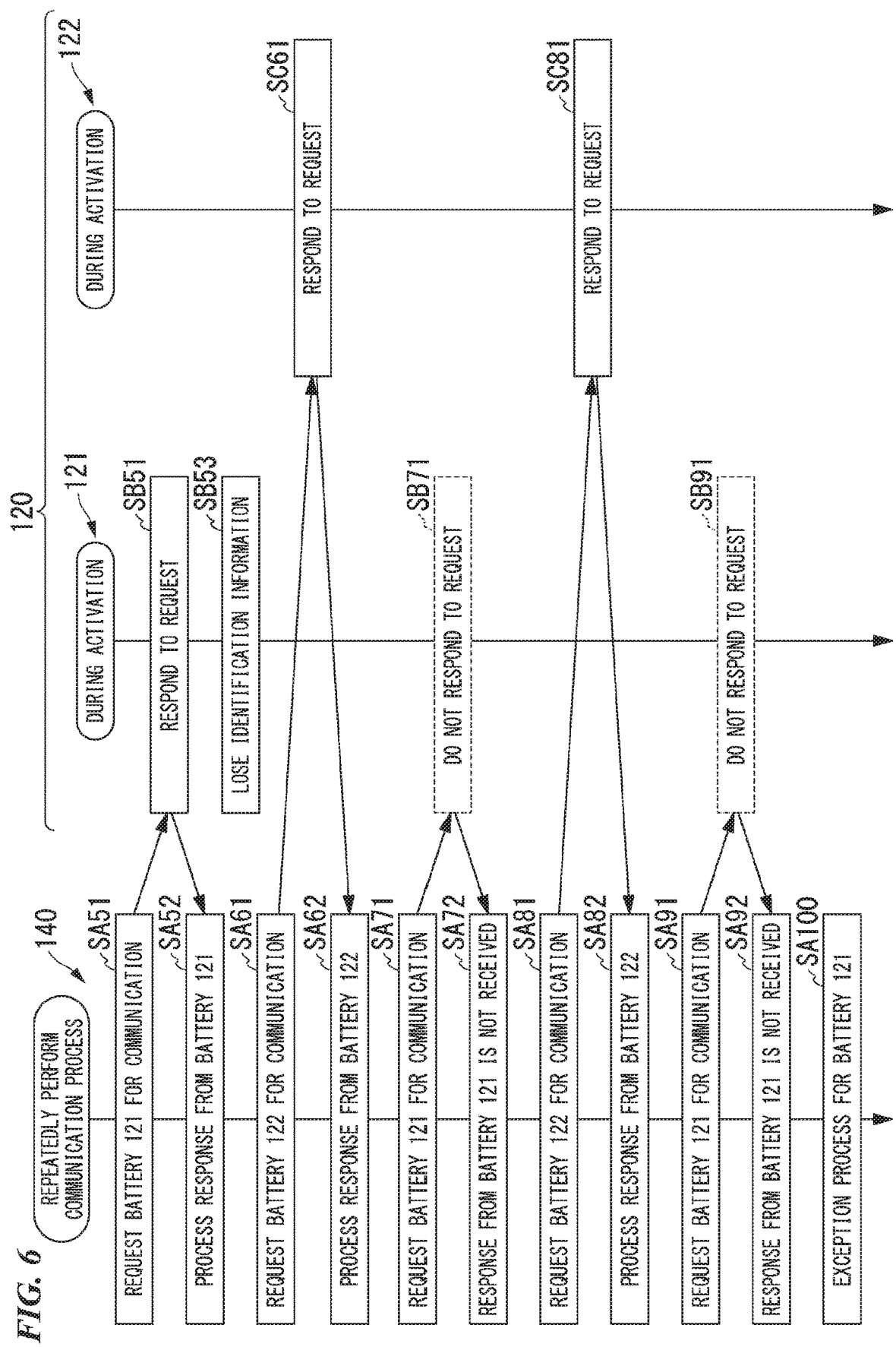
FIG. 6 is a diagram for describing a process of detecting a loss of the identification information of the battery of the embodiment.

FIG. 6 is a diagram for describing a process of detecting a loss of the identification information of the battery of the embodiment. The process shown in FIG. 6 is carried out after the identification information is set in the battery 120.

First, the ECU 140 requests the battery 121 for communication (SA51). The battery 121 that has received this responds to the request (SB51). The ECU 140 receives the response from the battery 121 and processes the response (SA52). As described above, a case in which the response to the request is able to be received is an example of a case in which the battery 121 does not lose the identification information.

After this, it is assumed that the loss of the identification information has occurred in the battery 121 (SB53).

Next, the ECU 140 requests the battery 122 for communication (SA61). The battery 122 that has received this responds to the request (SC61). The ECU 140 receives the response from the battery 122 and processes the response (SA62). As described above, a case in which the response to the request is able to be received is an example of a case in which the battery 122 does not lose the identification information. After this, it is assumed that the loss of the identification information does not occur in the battery 122.

The ECU 140 requests the battery 121 for communication similarly to SA51 (SA71). However, the battery 121 not is able to respond to the request (SB71). As a result, the ECU 140 is not able to obtain the response from the battery 121 (SA72).

In a case in which the ECU 140 requests the battery 122 for communication similarly to SA61 (SA81), the battery 122 responds to the request (SC81). The ECU 140 is able to obtain the response from the battery 122 and processes the response (SA82).

By repeating the same process with respect to the battery 121 (SA91 to SB91 to SA92), the same result as the case in which the request is transmitted at SA71 described above is obtained. By the process shown in FIG. 5 described above, in a case in which the response is not able to be received a predetermined number of times, an exception process of giving the identification number to the battery 121 again is carried out (SA100).

By the process described above, the ECU 140 is able to detect that the loss of the identification information has occurred.

FIG. 7 is a diagram for describing a process for resetting the identification number in the battery of the embodiment. An initial state in the procedure shown in FIG. 7 is a state in which the identification information of the battery 121 is lost by the procedure shown in FIG. 6. Note that, it is assumed that the battery 122 is the activation state (SC111).

First, the activation signal generation unit 141 of the ECU 140 releases (deactivates) the activation state of the battery 121 (SA111). Therefore, the power supply of the transceiver 1215 of the battery 121 is shut off (SB111).

The ECU 140 continues the state until the predetermined time T1 that is set in advance has elapsed, and waits for the end of the initialization process of the battery 121 (SA112). For example, the predetermined time is set to about one second. Therefore, the BMU 1212 of the battery 121 loses the identification information (SB112).

Next, the activation signal generation unit 141 of the ECU 140 transmits the activation signal ACT to the battery 121 for only the predetermined time T1 to activate the battery 121 (SA113). The battery 121 that has received the activation signal ACT supplies the electric power for control from the power supply unit 1216 to the BMU 1212 to input the power supply (SB113). The BMU 1212 carries out the initialization process at the time of activation (SB114), sets an initial value "#1" that is set in advance to the identification information (ID), and stores the initial value in the storage area.

Next, the management unit 145 of the ECU 140 transmits temporary data to the battery 121 using the identification information of the initial value (SA115). The battery 121 that has received the temporary data responds to a temporary data message (SB115).

Next, the activation signal generation unit 141 of the ECU 140 notifies the battery 121 of the identification information "#B1" given to the battery 121 (SA116).

Next, the BMU 1212 of the battery 121 obtains the identification information "#B1" and responds to the identification information "#B1" (SB116). The BMU 1212 stores the identification information "#B1" in the storage area.

By the process described above, the resetting of the identification information is able to be carried out.

According to the embodiment described above, the control system 10 has a function of managing the state of the battery 120 that is detachably mounted. The activation signal generation unit 141 generates the activation signal ACT for setting the mounted battery 120 to the available state. The management unit 145 of the ECU 140 manages the battery 120 that has received the activation signal ACT and the identification information of the battery 120 in association with each other. The control system 10 includes the Activate lines 1217 and 1227 for electrically connecting the BMU of the battery 120 and the activation signal generation unit 141, and the CAN communication lines (signal transmission lines) 1218 and 1228 for electrically connecting the BMU and the management unit 145. Therefore, it is possible to increase the convenience of the electric motorcycle 1 on which the battery 120 is detachably mounted.

In addition, the management unit 145 transmits the identification information of the battery 120 to the BMU through the transceiver 1215 activated by the activation signal ACT, therefore, the BMU does not acquires the identification information through the transceiver that is not activated.

In addition, the activation signal generation unit 141 generates the activation signal ACT for controlling the activation state of the battery 120 for each of the batteries 120.

In addition, the activation signal generation unit 141 may generate the first activation signal as the activation signal ACT for the battery 121 and give the first identification information corresponding to the first activation signal to the battery 121 and then generate the second activation signal as the activation signal ACT for the second battery 122.

In addition, after transmitting the activation signal ACT to be given to the battery 120 to be activated, the activation signal generation unit 141 may recover the activation signal ACT until the BMU 1212 of the battery 120 loses the control state. Therefore, it is possible to recover the battery 120 to the activation state until the battery 120 loses the identification information.

In addition, the activation signal generation unit 141 may generate an initialization request signal that continues for a predetermined time set in advance and the activation signal ACT that is delayed from the initialization request signal and is transmitted so as not to overlap with a transmission period of the initialization request signal.

In addition, the management unit 145 may give the identification information of the battery 121 to the BMU 1212 of the battery 120 that has received the activation signal ACT to associate the BMU 1212 and the identification information of the battery 121 with each other, during a period in which the initialization request signal and the activation signal ACT are not transmitted from the activation signal generation unit 141.

In addition, the storage battery management method in the electric motorcycle 1 as described above is a method for managing the state of the battery 120 that is detachably mounted. For example, the storage battery management method includes steps of generating the activation signal ACT for setting the battery 120 to an available state with respect to the mounted battery 120, and associating the identification information of the battery 120 with the BMU of the battery 120 that has received the activation signal ACT.

Note that the storage battery management method in the above-described electric motorcycle 1 may include steps of sequentially activating the plurality of batteries 120 mounted on the electric motorcycle 1 in accordance with a predetermined order, and giving the identification information to the battery 120.

Second Embodiment

The second embodiment will be described. In the first embodiment, an example in which the initialization process of the plurality of batteries is performed in parallel has been described. Instead of this, in the present embodiment, an example in which the initialization process of the plurality of batteries is sequentially performed will be described.

FIG. 8 is a diagram for describing a process for activating the battery of the embodiment. This FIG. 8 shows transmission and reception of signals between the ECU 140, the battery 121, and the battery 122, and a process related to the transmission and reception of the signals, instead of FIG. 4 described above.

First, the activation signal generation unit 141 of the ECU 140 continuously transmits the activation signal ACT to the battery 121 to activate the battery 121 (SA311). The ECU 140 continues the state until the predetermined time T1 that is set in advance has elapsed (SA312). For example, the predetermined time is set to about one second.

The battery 121 that has received the activation signal ACT supplies the electric power for control to the BMU 1212 from the power supply unit 1216 to input power supply (SB311).

The BMU 1212 carries out the initialization process at the time of the activation (SB312), sets an initial value "#1" that is set in advance in the identification information (ID), and stores the initial value in the storage area.

Next, the management unit 145 of the ECU 140 notifies the battery 121 of temporary data by using the identification information "#1" given to the battery 121 as the initial value (SA313). The BMU 1212 of the battery 121 receives the above-described temporary data and responds to the temporary data (SB313).

Next, the management unit 145 of the ECU 140 notifies the battery 121 of the given identification information using the identification information "#1" given to the battery 121 as the initialization value (SA314). The BMU 1212 of the battery 121 receives the above-described message M1, obtains the identification information "#B1", and responds to the identification information "#B1" (SB314). The BMU 1212 stores the identification information "#B1" in the storage area and responds to the message M1.

New identification information "#B1" is set to the battery 121 by the process up to here.

Subsequently, the ECU 140 sets new identification information "#B2" in the battery 122 by performing processes of procedures (SA321 to SA324) similar to the procedures of SA311 to SA314 described above.

The processes of SC321 to SC324 in the battery 122 are similar to the processes of SB311 to SB314 in the battery 121.

By the process described above, the ECU 140 is able to give new identification information to the battery 121 and the battery 122 to which the identification information is not set, and pieces of the identification information are able to be different from each other.

Note that, although the procedure shown in FIG. 8 shows a case in which two batteries are controlled, the number of batteries, the order of the setting, and the like are not limited thereto, and are able to be appropriately selected.

Note that the ECU 140 and the BMU by the embodiment include a computer system. The ECU 140 and the BMU may record a program for realizing the process described above in a computer-readable recording medium and cause a computer system to read and execute the program recorded in the recording medium to execute the various processes described above. Note that the "computer system" referred to here may include an OS and hardware such as a peripheral device. In addition, the "computer-readable recording medium" refers to a flexible disk, a magneto-optical disk, a ROM, a writable nonvolatile memory such as a flash memory, a portable medium such as a CD-ROM, a storage device such as a hard disk incorporated in the computer system.

In addition, the "computer-readable recording medium" includes one that holds the program for a fixed time such as a volatile memory (for example, dynamic random access memory (DRAM)) inside the computer system that becomes a server or a client in a case in which a program is transmitted through a network such as the Internet or a communication line such as a telephone line. In addition, the program may be transmitted from a computer system in which the program is stored in a storage device or the like to another computer system through a transmission medium or by transmission waves in the transmission medium. Here, the "transmission medium" for transmitting the program is a medium having a function of transmitting information, such as a network (communication network) such as the Internet or a communication line such as a telephone line. In addition, the program may be for realizing a part of the functions described above. Furthermore, the program may be a so-called difference file (difference program) that is able to realize the functions described above in combination with a program already recorded in the computer system.

Although the embodiments of the present invention have been described above with reference to the drawings, the present invention is not limited to these embodiments in any way, and various modifications and substitutions may be made without departing from the gist of the present invention.

DESCRIPTION OF THE REFERENCE SYMBOLS

1 Electric motorcycle (moving body)
10 Control system (storage battery management system)
110 Electric circuit
115 Contactor
120, 121, 122 . . . Battery
120C Battery storage unit
130 PDU (load)
135 Electric motor
140 ECU
160 Sub battery
180 Throttle (accelerator) sensor
1211, 1221 Battery main body (power supply)
1212, 1222 BMU
1213, 1223 Bidirectional switch (first switch)
1214, 1224 Insulation unit
1215, 1225 CAN-BUS transceiver (communication IF unit)
1217, 1227 Activate line (activation signal transmission line)
1218, 1228 CAN communication line (signal transmission line)

The invention claimed is:

1. A storage battery management system that manages a state of a plurality of storage batteries that are detachably mounted, the storage battery management system comprising:
an activation signal generation unit configured to generate an activation signal for setting a mounted storage battery to an available state;
a management unit configured to manage the mounted storage battery that has received the activation signal and identification information of the mounted storage battery in association with each other;
a first activation signal transmission line configured to electrically connect a storage battery management unit of a first storage battery among the plurality of storage batteries and the activation signal generation unit with each other;
a second activation signal transmission line configured to electrically connect a storage battery management unit of a second storage battery different from the first storage battery among the plurality of storage batteries and the activation signal generation unit with each other, the second activation signal transmission line being different from the first activation signal transmission line;
a first signal transmission line configured to electrically connect the storage battery management unit of the first storage battery and the management unit with each other; and
a second signal transmission line configured to electrically connect the storage battery management unit of the second storage battery and the management unit with each other, the second signal transmission line being different from the first signal transmission line,
wherein:
the activation signal generation unit supplies the activation signal to the first storage battery through the first activation signal transmission line;

the activation signal generation unit does not give first identification information through a communication line and the second signal transmission line to the second storage battery that is in an unavailable state by a fact that the activation signal is not supplied through the second activation signal transmission line, and the activation signal generation unit gives the first identification information through a communication line and the first signal transmission line to the first storage battery that is in an available state by a fact that the activation signal is supplied through the first activation signal transmission line; then the activation signal generation unit supplies the activation signal to the second storage battery through the second activation signal transmission line; and the activation signal generation unit does not give second identification information, that is different from the first identification information, through a communication line and the first signal transmission line to the first storage battery that is in an unavailable state by a fact that the activation signal is not supplied through the first activation signal transmission line, and the activation signal generation unit gives the second identification information through a communication line and the second signal transmission line to the second storage battery that is in an available state by a fact that the activation signal is supplied through the second activation signal transmission line.

2. The storage battery management system according to claim 1,
wherein a communication IF unit provided in each storage battery of the plurality of storage batteries is activated by a supply of the activation signal.

3. The storage battery management system according to claim 1,
wherein the activation signal generation unit recovers the activation signal until the storage battery management unit of the mounted storage battery loses a control state after transmitting the activation signal to be given to the mounted storage battery of a target to be activated.

4. The storage battery management system according to claim 3,
wherein the activation signal generation unit generates an initialization request signal that continues for a predetermined time set in advance and the activation signal that is delayed from the initialization request signal and is transmitted so as not to overlap with a transmission period of the initialization request signal.

5. The storage battery management system according to claim 4,
wherein the management unit gives the identification information of the mounted storage battery to the storage battery management unit of the mounted storage battery that has received the activation signal to associate the storage battery management unit and the identification information of the mounted storage battery with each other, during a period in which the initialization request signal and the activation signal are not transmitted from the activation signal generation unit.

6. A moving body that manages a state of a plurality of storage batteries that are detachably mounted, the moving body comprising:
an activation signal generation unit configured to generate an activation signal for setting an available state with respect to a mounted storage battery;

a management unit configured to associate identification information of the mounted storage battery with a storage battery management unit of the mounted storage battery that has received the activation signal;

a first activation signal transmission line configured to electrically connect a storage battery management unit of a first storage battery among the plurality of storage batteries and the activation signal generation unit with each other;

a second activation signal transmission line configured to electrically connect a storage battery management unit of a second storage battery different from the first storage battery among the plurality of storage batteries and the activation signal generation unit with each other, the second activation signal transmission line being different from the first activation signal transmission line;

a first signal transmission line configured to electrically connect the storage battery management unit of the first storage battery and the management unit with each other;

a second signal transmission line configured to electrically connect the storage battery management unit of the second storage battery and the management unit with each other, the second signal transmission line being different from the first signal transmission line; and a drive unit configured to be driven by electric power from the mounted storage battery, wherein:

the activation signal generation unit supplies the activation signal to the first storage battery through the first activation signal transmission line;

the activation signal generation unit does not give first identification information through a communication line and the second signal transmission line to the second storage battery that is in an unavailable state by a fact that the activation signal is not supplied through the second activation signal transmission line, and the activation signal generation unit gives the first identification information through a communication line and the first signal transmission line to the first storage battery that is in an available state by a fact that the activation signal is supplied through the first activation signal transmission line; then the activation signal generation unit supplies the activation signal to the second storage battery through the second activation signal transmission line; and the activation signal generation unit does not give second identification information, that is different from the first identification information, through a communication line and the first signal transmission line to the first storage battery that is in an unavailable state by a fact that the activation signal is not supplied through the first activation signal transmission line, and the activation signal generation unit gives the second identification information through a communication line and the second signal transmission line to the second storage battery that is in an available state by a fact that the activation signal is supplied through the second activation signal transmission line.

7. A storage battery management method for managing a state of a plurality of storage batteries that are detachably mounted, the storage battery management method comprising:
generating an activation signal for setting an available state with respect to a mounted storage battery; and associating identification information of the mounted storage battery with a storage battery management unit of the mounted storage battery that has received the activation signal, wherein the storage battery management method comprises:

(a) supplying the activation signal to a first storage battery through a first activation signal transmission line to give first identification information through a communication line to the first storage battery, that is in an available state, by a fact that the activation signal is supplied through a first activation signal transmission line without giving the first identification information through the communication line to a second storage battery different from the first storage battery, which is in an unavailable state, by a fact that the activation signal is not supplied through a second activation signal transmission line that is different from the first activation signal transmission line;

(b) after (a), supplying the activation signal to the second storage battery through the second activation signal transmission line to give second identification information, that is different from the first identification information, through the communication line to the second storage battery that is in an available state by a fact that the activation signal is supplied through the second activation signal transmission line without giving the second identification information through the communication line to the first storage battery, that is in an unavailable state, by a fact that the activation signal is not supplied through the first activation signal transmission line.

* * * * *